June 26, 1928.
C. W. SCHEIDE
1,675,055
HOOD SUPPORT FOR CAMERAS
Filed March 24, 1924
2 Sheets-Sheet 1
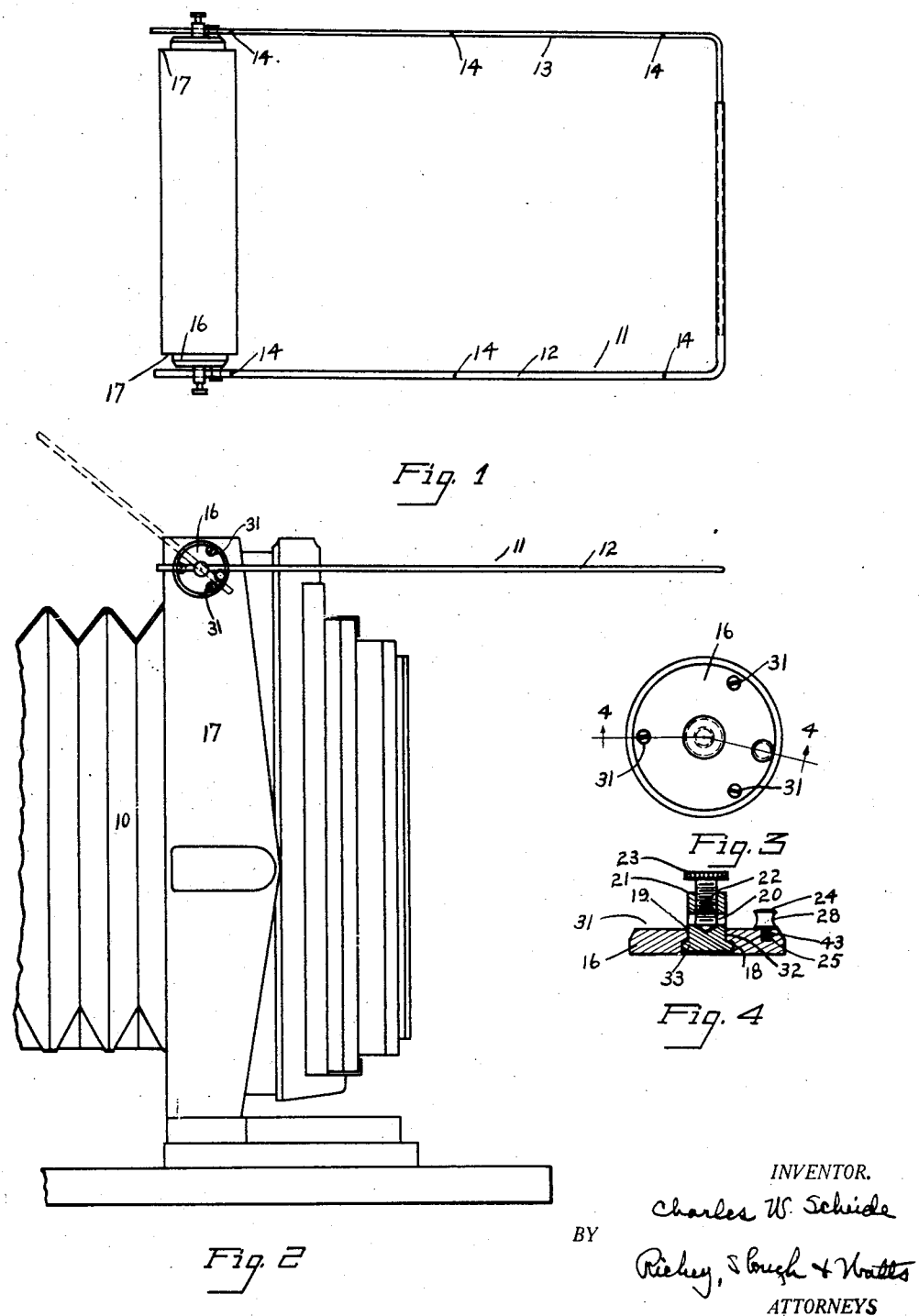
*INVENTOR.*
Charles W. Scheide
BY
Richey, Slough & Watts
*ATTORNEYS*

June 26, 1928.
C. W. SCHEIDE
1,675,055
HOOD SUPPORT FOR CAMERAS
Filed March 24, 1924    2 Sheets-Sheet 2
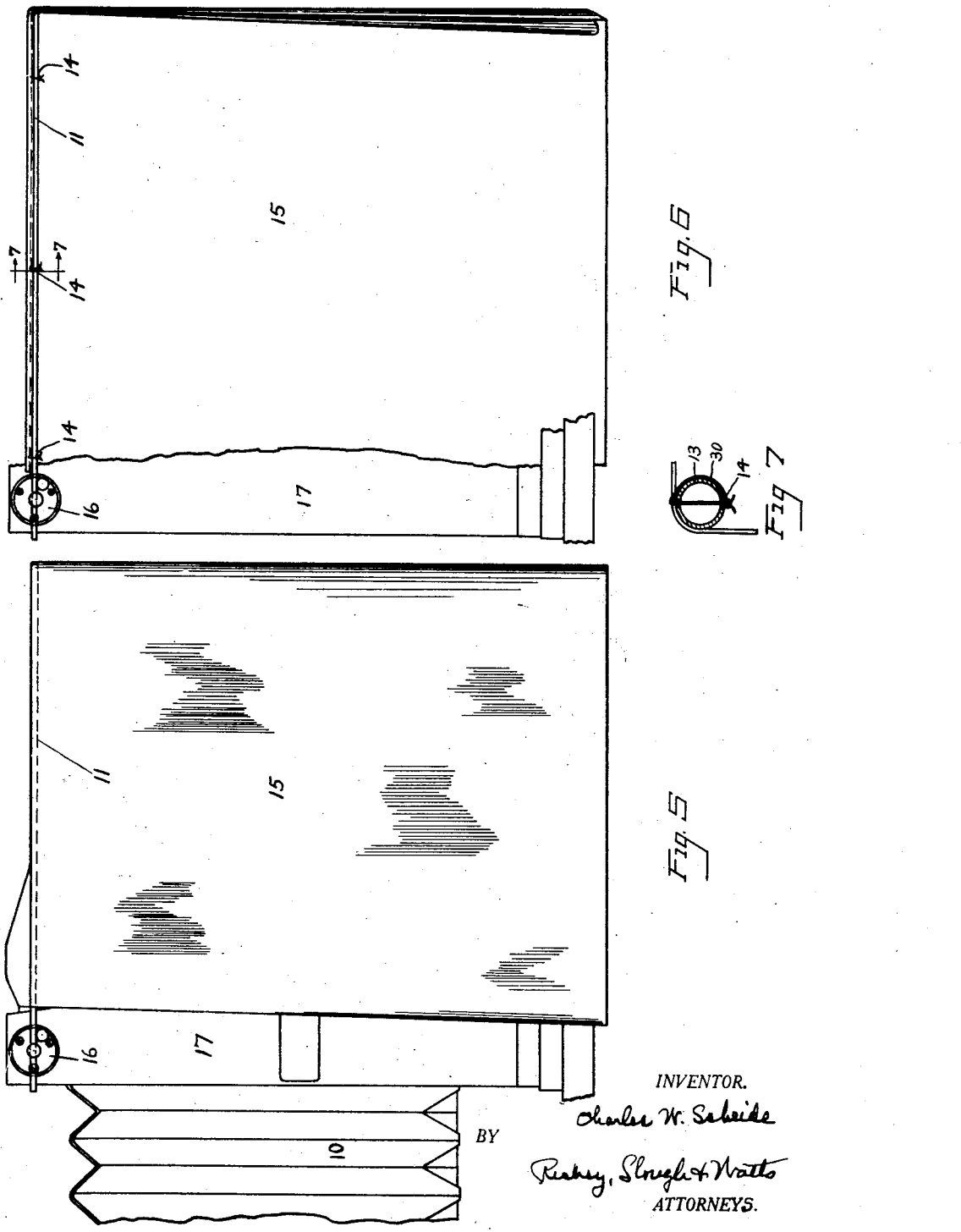
INVENTOR.
Charles W. Scheide
BY
Richey, Slough & Watts
ATTORNEYS.

Patented June 26, 1928.

1,675,055

UNITED STATES PATENT OFFICE.

CHARLES W. SCHEIDE, OF ELYRIA, OHIO.

HOOD SUPPORT FOR CAMERAS.

Application filed March 24, 1924. Serial No. 701,316.

This invention relates to hood supports for cameras.

With certain types of cameras, a hood is employed to encase the operator's head and the end of the camera through which the user observes the object, while focusing, the hood being necessary to shut off the light from such end of the camera so that the user can clearly see the object. Usually the hood is a length of cloth, which the user must adjust over his head and the end of the camera each time he makes a focusing adjustment, or an observation. Ordinarily the user makes several adjustments and observations, and considerable time is therefore required to adjust the hood preparatory to making the exposure. The hood often slips, or is moved, after being placed to encase the user's head and the camera end, thereby requiring an additional adjustment of the hood before he can continue with his observations, or focusing operation.

An object of my invention is to provide a support for the hood which can be quickly adjusted to cover or uncover the user's head and the end of the camera through which he is observing the object to be photographed.

Another object of my invention is to secure the hood with the camera so that it can not be misplaced when in use.

Another object of my invention is to provide a supporting frame for a camera hood which can be adjusted to suit different widths of cameras and which can be extended different distances from the point of its attachment with a camera.

These and other objects and the invention itself will be clearly set forth hereinafter.

In the accompanying drawings illustrating an embodiment of my invention—

Fig. 1 is a plan view of the same.

Fig. 2 is a side elevation of a portion of a camera with the hood frame attached thereto;

Fig. 3 is an enlarged plan view of the device for securing the end of the support with the camera;

Fig. 4 is a section of the same taken on line 4—4 of Fig. 3;

Fig. 5 is a view similar to Fig. 1 with the hood attached thereto;

Fig. 6 is a similar view with one side of the curtain thrown back showing the manner of securing it to the supporting frame; and Fig. 7 is an enlarged transverse section taken on line 7—7 of Fig. 6, illustrating the manner of securing the curtain to its support.

Referring now to the drawings by characters of reference 10 illustrates a conventional form of camera, of the type in which the operator looks through the rear end to see the object while making his focus adjustments, and for observations. With such cameras it is necessary that the light be excluded from the end of the camera where the operator places his head, and usually a fabric cloth, or hood, is thrown overhead and such end of the camera.

To obviate the difficulties which follow such practice, such as the cloth slipping, or the accidental displacement of the cloth so that light is admitted under the hood, and to provide an easy manner of encasing the head and the rear end of the camera, I provide a supporting frame 11. Such frame is formed preferably of two angle rods 12 and 13. One end of the rod 12 is hollow, and of a diameter such that it telescopes the adjacent end of the rod 13. When the rods are so assembled, they provide a U-shaped frame. The portion of the rods forming the sides of the frame are provided with a plurality of spaced openings 14, so that the hood 15 extending over the frame can be secured to the rods by threads 30, as shown in Fig. 7 of the drawing.

Brackets 16 are secured by screws 31 to the side frame 17 of the camera adjacent the top of the rear end thereof. The inner face of the brackets are provided with recesses 18, and an aperture 32 extends through the bracket concentrically with the recessed portion. A journal member 19 extends through the aperture and terminates in a flanged end 33 which lies within the recess 18, when the brackets are secured to the camera. The journal members are free to rotate relative to their supporting brackets, and are provided with transversely extending apertures 20 through which the ends of the hood supporting frame extend. The projecting ends of the journal members are provided with axial apertures 21 which extend from the transverse apertures through the end of the members. The inner walls formed by the axially extending recesses are threaded, and a stud 22 is screwed therein, the end of the stud having a knurled head 23 for such manipulation. When the ends of the supporting frame sides are extended through the apertures 20, so that the frame extends rearwardly the desired distance, the studs are screwed into the axial apertures 22, until they tightly engage the side portions of the rods, thereby securing them in such position. To adjust the distance, the support extends rearwardly from the camera, the studs are screwed out of engagement with the frame sides; the supporting frame can also be disassembled from the camera when the studs are in removed relation with the frame sides.

The side frame members being outside of the camera frame, permits the hood and frame to be swung upwardly when the hood is not in use to shield the observing end of the camera from the light, such movement being permitted as the journals 19, to which the frame is secured, are rotatably mounted with the brackets.

A stop member consisting of a threaded shank 43 and a head 24 is screwed into an aperture 25 in each of the brackets. The heads of the stop members are each provided with an annular curved groove 28 of such a diameter that the rods will fit therein. The stops are so positioned that when the hood frame is swung down, they will support the frame in substantially horizontal position, and the same stops will be engaged by the ends of the frame extending through the journal when the frame is thrown upwardly as shown in dotted lines in Fig. 2 of the drawings. In this manner, the stops limit the swinging movement of the hood frame in both directions of its movement.

The hood is secured to the supporting frame so that it extends over the rear end of the camera covering the top and sides thereof, and covers the frame, extending down at the sides and rear therefrom, thereby being secured in operative position so that it can not slip, or be moved out of position. The hood being attached to the frame, and the frame being mounted to swing up and down relative to the camera, allows the operator to readily enclose his head and the end of the camera through which he looks by simply swinging the hood down, until the support engages the stops on the brackets.

The brackets and the frame it will be noted are constructed so that they can be attached to cameras of varying widths or sizes.

Various changes may be made in the details and construction above specified without departing from the spirit of my invention and the scope of the appended claims.

What I claim is:—

1. In combination with a camera, brackets secured to the sides of said camera, rotatable bearings carried by said brackets, a frame having side members extending adjacent the sides of said camera and secured to said rotatable bearings, said frame being adapted to extend rearwardly from the rear end of said camera, and a hood secured over said frame, said hood extending over the rear end of said camera, and aligned studs extending from said brackets to limit the pivotal movement of said frame, said studs supporting said frame at the extreme limits of its travel.

2. In combination with a camera, brackets secured to the sides of said camera, rotatable bearings extending from said brackets having apertures transversely therethrough, a frame having side portions slidably mounted through the apertures in said bearings, adjustable means for clamping the side portions of said frame with said bearings, said frame extending rearwardly from said camera, and a hood extending over said frame and the rear portion of said camera, said hood being attached to said frame.

In testimony whereof I hereunto affix my signature this 19th day of March, 1924.

CHARLES W. SCHEIDE.